UNITED STATES PATENT OFFICE.

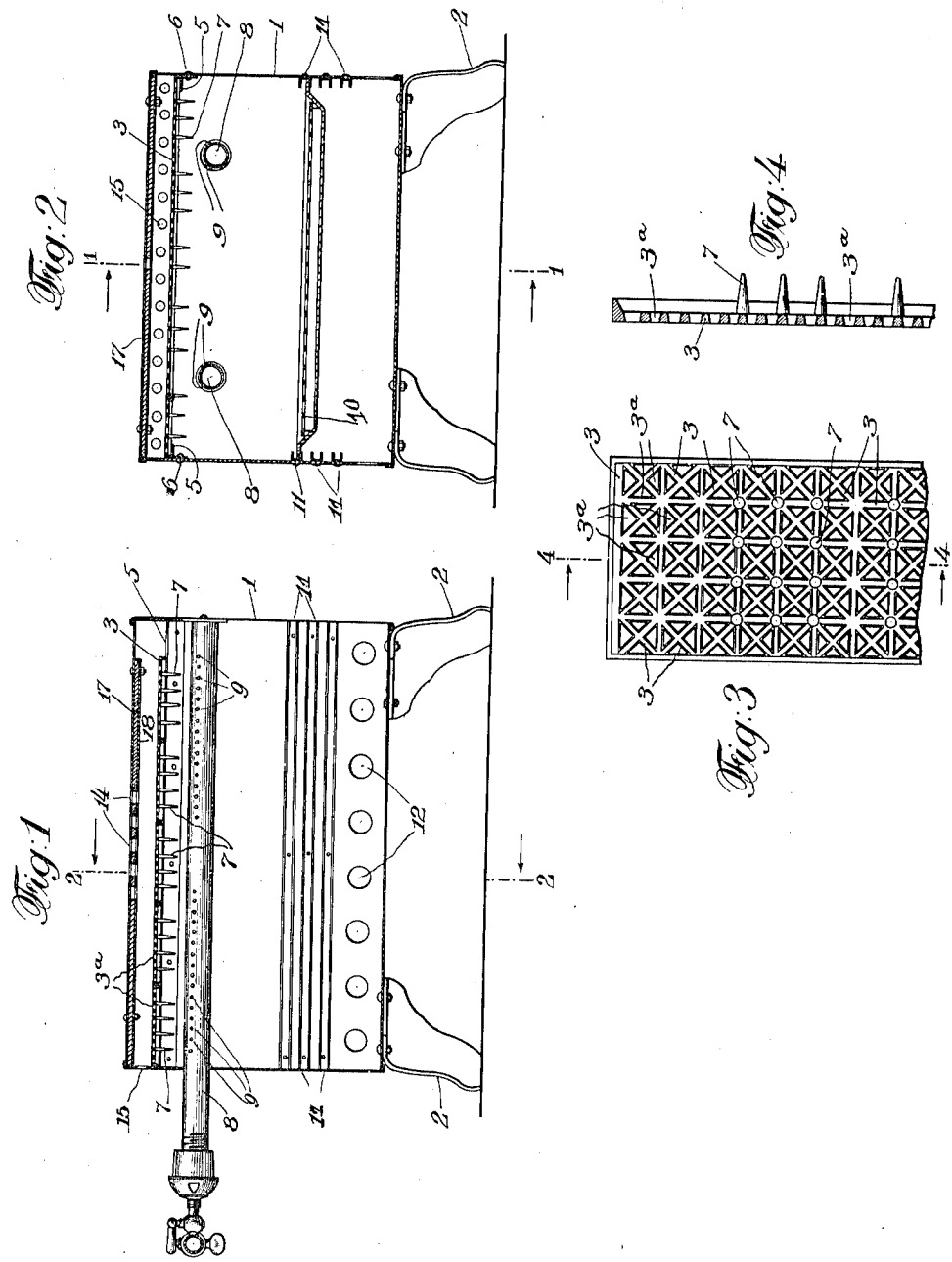

JOHN M. BROCK, OF FLUSHING, NEW YORK, ASSIGNOR TO WILLIAM M. CRANE COMPANY, A CORPORATION OF NEW YORK.

TOASTER AND BROILER.

1,073,660.　　　　　Specification of Letters Patent.　　Patented Sept. 23, 1913.

Application filed November 5, 1909. Serial No. 526,334.

*To all whom it may concern:*

Be it known that I, JOHN M. BROCK, a citizen of the United States, and a resident of Flushing, Queens county, State of New York, have invented certain new and useful Improvements in Toasters and Broilers, of which the following is a specification.

My invention relates to cooking utensils; and, while it may be embodied in constructions adapted for various purposes, it is more particularly applicable to toasters and broilers for bread, meat, and the like.

Objects of the invention are to provide an improved construction of the character referred to in which the material shall be uniformly and evenly subjected to the action of the heat; which shall have a large capacity and be quick and efficient in operation; and which shall be simple and durable in construction and economical in operation.

These and other objects of the invention will in part be obvious and in part be more fully explained in the following description.

My invention consists in the novel parts, improvements, combinations, and features of construction herein shown and described.

The accompanying drawings, which are referred to herein and form a part hereof, illustrate one embodiment of the invention, the same serving in connection with the description herein to explain the principles of the invention.

Of the drawings: Figure 1 is a longitudinal section of a gas stove constructed in accordance with certain features of my invention, taken on the line 1—1 of Fig. 2; Fig. 2 is a transverse section of the same, taken on the line 2—2 of Fig. 1; Fig. 3 is a top plan of a detail; and Fig. 4 is a section thereof, taken on the line 4—4 of Fig. 3.

A toaster and broiler constructed in accordance with certain features of my invention includes in combination, a burner so arranged that the flames will be upwardly directed, and a heat-radiating member located above said burner and arranged and adapted to radiate the heat downwardly.

In accordance with one embodiment of this feature of the invention, a pair of tubular gas burners of the Bunsen type is provided, each of said burners having on each of its opposite upper sides a series of upwardly directed perforations.

According to certain other features of the invention, means are provided for supporting the material to be cooked, said means being arranged beneath the burner, and all said members being located within the casing.

According to other features of the invention, the heat-radiating member is perforated and provided with downwardly extending projections, whereby the heat-receiving and radiating capacity of the member is increased; the casing is provided with air inlets in the sides thereof beneath the supports for the material to be cooked; and said casing is provided with ventilating openings in its top and also in the end above the heat-radiating member.

These and other features of the invention will be more particularly set forth in the following description.

Referring now in detail to the particular embodiment of the invention illustrated in the drawings, the same as shown consists of a casing 1 oblong in shape and mounted on legs 2.

According to one feature of the invention, the parts of the device are so arranged that the heat is conducted and radiated downwardly upon the material to be cooked. In the embodiment of the invention illustrated, therefore, which is particularly adapted for toasting and broiling bread, meat, and the like, a heat-conducting and radiating medium is arranged in the casing 1 near the top thereof in such manner that the heat rising thereto from burners located beneath the same will be uniformly and evenly radiated downwardly upon the material to be cooked, which is suitably placed beneath the burners, as will be hereinafter explained. While said conducting and radiating medium may be made in various ways and proportions, preferably, the same is divided into a convenient number of rectangularly shaped plates of cast iron which are suitably perforated to permit of the plates being heated quickly and to increase the heat-radiating and conducting surface. These plates 3, which preferably extend from one side of the casing to the other and which are in number sufficient to fill their horizontal plane of the casing, are secured in place by resting upon inwardly projecting ledges or supports 5, extending along the side walls of the casing to which they are suitably fastened, as by rivets 6.

In order to develop the heat-radiating and conducting capacity of the plate 3 to the maximum, preferably, the under surface of the same is increased by a plurality of downwardly extending projections 7, as shown, so spaced apart as to radiate the heat throughout a large extent of the surface of the material to be cooked.

Suitable sources of heat are provided, the same in the preferred embodiment of the invention illustrated comprising a pair of tubular gas burners 8 of the Bunsen type located in the upper part of the casing and extending longitudinally thereof. These burners, as shown, are parallel to each other and to the side walls of the casing and are suitably spaced apart from said side walls and from each other so that the heat will be distributed as evenly as practicable upon the said heat-radiating and conducting plate 3 and throughout the entire extent of the same, whereby the heat-radiating plate 3 will by conduction more evenly distribute the heat and radiate it with great uniformity downwardly upon the material to be acted upon. To this end, also, the perforations 9 of the burners are preferably upwardly directed, at suitable angles, and are arranged in series along the opposite sides of the upper portions of each burner, the central portion of the inner side of each burner being devoid of perforations for a suitable distance, as shown, so that no excess of heat may be furnished to the central portion of the heat-radiating member 3.

It will be noted that although the heat is thus radiated downwardly upon the material to be cooked, the flames and waste products of combustion pass upwardly and do not therefore come in contact with the material to be cooked. It will also be noted that by reason of the perforations in the heat-radiating plate 3, the waste products of combustion pass through said plate 3 and are disposed of in a manner presently to be described.

Suitable means are provided for supporting the material to be acted upon by the downwardly radiated heat, as the bread to be toasted or the meat to be broiled, the same, preferably, consisting of a suitable tray or grid 10 supported on suitable horizontal ledges 11 which may be spaced at varying distances from the burners and radiating member so that the tray may be adjusted with relation to the source of heat to secure the best results under varying conditions. Preferably, also, suitable air inlets 12 are formed in the lower opposite side walls of the casing 1 at a suitable distance below the supports 11 to distribute with substantial uniformity the air supply to the casing. As heretofore noted, the waste products of combustion pass upwardly through the perforations in the heat-radiating plate 3. Suitable ventilating openings are provided for the escape of the heated gases and waste products of combustion, as shown, openings 14 being formed in the center of the top of the casing and additional openings 15 being formed along the end wall of the casing between the heat-radiating plate 3 and the top of the casing. While suitable provision is thus made for the escape of the heated products of combustion, it will be noted that the vents are so arranged that no currents of air will interfere with the uniform action of the heat upon the material treated. Access to the broiling chamber is obtained by a door (not shown) in the front end of the casing.

If desired, insulation may be provided in suitable places. As shown, the top is insulated by a sheet of asbestos board, or similar material, 17 confined between the top and a plate 18.

It will be seen that a stove constructed in accordance with my invention will be highly efficient for toasting bread and similar material, broiling meat and other foods, and otherwise subjecting various articles to the action of heat; will be simple in construction, economical in operation, and of great capacity, being especially valuable in this respect as a toaster and broiler for hotel and restaurant use where large quantities are required in short time.

Other advantages will be apparent to those skilled in the art.

My invention in its broader aspects is not limited to the precise construction shown and described, as many changes may be made in the details thereof without departing from the main principles of the invention and without sacrificing its chief advantages.

I claim:

1. A gas stove including in combination, a casing having vents in the top portion thereof, a burner located within said casing and having its perforations upwardly directed, a heat-radiating member located between said burner and the top of said casing, said heat-radiating member being perforated and having an irregular under surface, and means arranged beneath said burner for supporting the food to be cooked, said casing being provided with air inlets beneath said supporting means and with vents formed therein between said heat-radiating member and the top of the casing.

2. A gas stove including in combination, a casing having vents in the top thereof, a plurality of burners arranged within said casing and extending longitudinally thereof, each of said burners having a series of upwardly directed perforations extending along opposite sides of its upper portion, a heat-radiating member located above said burners and beneath the top of said casing, said heat-radiating member being perforated and having downwardly extending projections, and means arranged beneath said burners and within said casing to support the food to be cooked, said casing being provided with air inlets beneath said supporting means and with ventilating openings in the end wall between said radiating member and the top of said casing.

3. A gas stove including in combination, a casing having ventilating openings in the top thereof, a pair of substantially parallel burners located within said casing and extending longitudinally thereof, each of said burners having a series of upwardly directed perforations extending along opposite sides of its upper portion the central inner side of each such burner being devoid of said perforations, a heat-radiating member consisting of a plurality of rectangularly shaped parts arranged above said burners and beneath the top of and removably secured to said casing, said parts being perforated and provided with downwardly extending projections, means arranged beneath said burners for supporting the food to be cooked, and said casing being provided with air inlets beneath said supporting means and with ventilating openings in the end wall between said radiating member and the top of said casing.

4. A gas stove including in combination, a casing having vents in the top thereof, a plurality of burners arranged within said casing and extending longitudinally thereof, each of said burners having a series of upwardly directed perforations extending along opposite sides of its upper portion, a heat-radiating member located above said burners and beneath the top of said casing, said heat-radiating member being perforated and having downwardly extending projections, and means arranged beneath said burners and within said casing to support the food to be cooked, said casing being provided with air inlets beneath said supporting means and with ventilating openings formed therein between said heat-radiating member and the top of the casing.

5. A gas stove including in combination, a casing having ventilating openings in the top thereof, a pair of substantially parallel burners located within said casing and extending longitudinally thereof, each of said burners having a series of upwardly directed perforations extending along opposite sides of its upper portion the central inner side of each such burner being devoid of said perforations, a heat-radiating member consisting of a plurality of rectangularly shaped parts arranged above said burners and beneath the top of and removably secured to said casing, said parts being perforated and provided with downwardly extending projections, means arranged beneath said burners for supporting the food to be cooked, and said casing being provided with air inlets beneath said supporting means and with ventilating openings formed therein between said heat-radiating member and the top of the casing.

In testimony whereof, I have signed my name to this specification, in the presence of two subscribing witnesses.

JOHN M. BROCK.

Witnesses:
GEO. WIBERLEY,
H. B. RAMSDELL.